March 27, 1956     J. A. CHOKAE     2,739,384
WINDAGE AND ELEVATION ADJUSTABLE
MOUNT FOR TELESCOPIC GUNSIGHT
Filed April 15, 1952
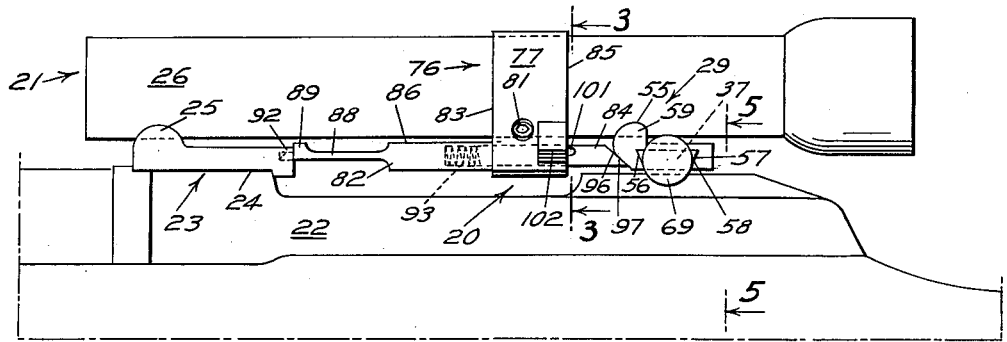
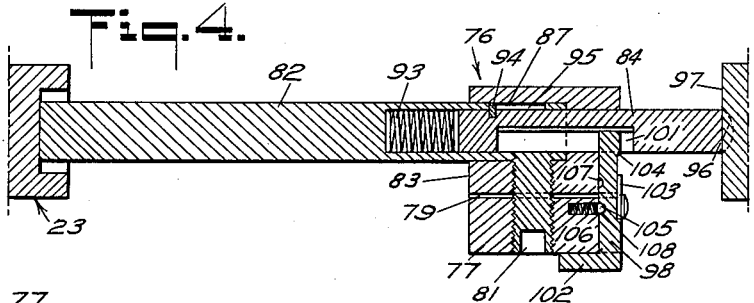
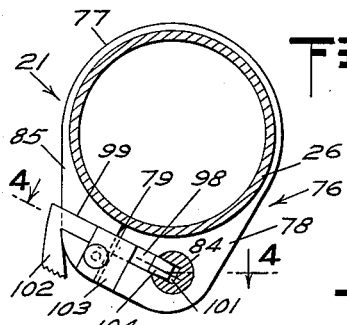
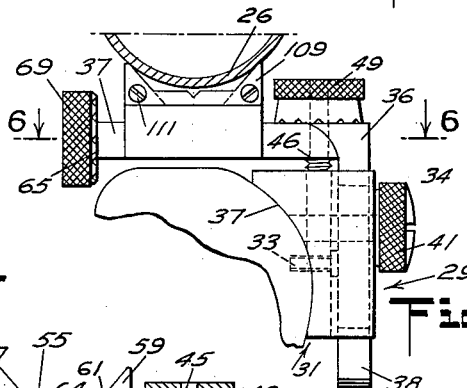
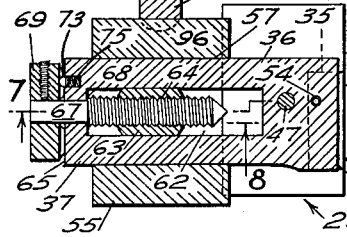
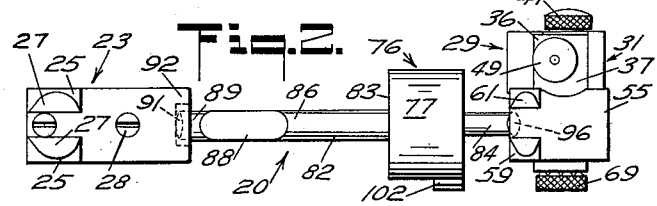
INVENTOR
JAMES A. CHOKAE
BY Gardner & Zimmerman
ATTORNEYS

United States Patent Office 2,739,384
Patented Mar. 27, 1956

2,739,384

WINDAGE AND ELEVATION ADJUSTABLE MOUNT FOR TELESCOPIC GUNSIGHT

James A. Chokae, Richmond, Calif.

Application April 15, 1952, Serial No. 282,326

9 Claims. (Cl. 33—50)

In general, my invention relates to telescopic gunsight mounts and, more particularly, to such mounts which provide adjustable settings of the telescopic sight, easy detachability from the gun and which mount is easily convertible into an open or receiver sight.

Telescopic sights for guns, while offering many advantages for certain types of shooting, present a difficult mounting problem if the maximum accuracy and utility is to be obtained from the firearm upon which it is mounted. While telescopic sights which feature internal windage and elevation adjustments are widely used, the maximum optical properties are not obtainable therein if a major adjustment is required to obtain correct point of impact of the fired projectile. Moreover, adequate sealing of the adjustment means is difficult in such telescopic sights thereby increasing danger of inadvertent introduction of moisture into the scope leading to fogging of the optics under certain conditions. Also, due to the construction of the mounts employed, it is almost impossible to remove the internally adjusted sight and later replace it in the mounts without disturbing the point of impact, thereby necessitating a tedious "sighting-in" operation.

In order to overcome difficulties encountered with internally adjusted telescopic sights, several excellent optical sights have been made available which feature fixed placement of the aiming joint of the reticule exactly on the optical center of the optical system whereby maximum clarity and lack of parallax is obtained. Moreover, such sights are much more easily sealed to eliminate fogging of the optics. However, as such sights lack a built-in adjustment, provision must generally be made in the mount for adjusting windage and elevation.

An ideal mount, for use with either the fixed reticule type or interally adjustable type of telescopic sight, should provide means whereby the sight may be repeatedly and easily mounted or dismounted from the same or a different firearm with exact return to zero adjustment. The mount should also be rugged to withstand abuse and the shock resulting from recoil. Of prime importance, the mount should be easily converted to provide either open or receiver sights if it becomes necessary to remove the telescopic sight due to damage or as required by prevailing shooting conditions.

It is, therefore, an object of my invention to provide a windage and elevation adjustable mount for attaching a telescopic sight to a firearm.

Another object of my invention is to provide a telescopic gunsight mount which is adapted for quick detachment of the sight from a firearm.

Still another object of my invention is to provide a windage and elevation adjustable telescopic gunsight mount from which the telescopic sight may be detached and replaced with an exact return to zero adjustment.

A further object of my invention is to provide a windage and elevation adjustable telescopic gunsight mount which is quickly convertible to either an open or receiver type sight following removal of the telescopic sight.

A still further object of my invention is to provide a telescopic gunsight mount wherein a micrometric, windage and elevation adjusting mounting block assembly is affixed to rear receiver portions of the firearm, a fixed mounting block portion is attached to forward receiver portions and an assembly including novel locking means is employed to engage barrel portions of the sight with said adjusting and fixed mounting block portions of the mount.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing may be adopted within the scope of the invention as set forth in the claims.

With reference to said drawing:

Figure 1 is a side elevational view illustrating the mount of the invention as employed to attach a telescopic sight to receiver portions of a firearm;

Figure 2 is a plan view of the telescopic gunsight mount with sight removed;

Figure 3 is a rear transverse view partially in cross section taken along the plane 3—3 of Figure 1 and illustrating details of the split ring assembly employed to retain the telescopic sight in the mount;

Figure 4 is a horizontal cross sectional view taken along the plane 4—4 of Figure 3;

Figure 5 is a rear transverse elevational view of rear portions of the mount taken along the plane 5—5 of Figure 1;

Figure 6 is a horizontal transverse cross sectional view taken along the plane 6—6 of Figure 5 and illustrating details of the micrometric windage adjustment of the mount;

Figure 7 is a rear transverse vertical cross sectional view taken along the plane 7—7 of Figure 6 and illustrating details of the micrometric windage and elevation adjustments of the mount;

Figure 8 is a rear transverse vertical cross sectional view taken along the plane 8—8 of Figure 6 and illustrating details of the elevation adjustment locking means of the mount.

In general, the telescopic gunsight mount of my invention is provided with a fixed mounting block adapted to be mounted on forward portions of a firearm receiver, whereby a V-block saddle portion of said block may receive and position a barrel portion of a telescopic sight over the axis of the barrel bore. The mount is also provided with an assembly including a transversely adjustable carriage block portion carried by a vertically adjustable arm member which is supported on rear portions of a firearm receiver, whereby a V-block saddle portion of said carriage block may receive and position the barrel portion over the axis of the barrel bore. To complete the mount of my invention, there is provided a member adapted to permanently engage central barrel portions of a telescopic sight and to detachably engage portions of first and second blocks, whereby barrel portions of said sight are brought into positive and locked engagement with said saddles of the blocks. Accordingly, transverse adjustment of said second block and vertical adjustment of said arm provide windage and elevation adjustment, respectively, for the telescopic gunsight mounted therein.

Details of the mount 20 of my invention will be described with reference to the particular installation of a telescopic sight 21 on a receiver 22 of a bolt action type of firearm, as illustrated in Figure 1 of the accompanying drawing. It will be appreciated that with modification, such mounting installation may be made on other types of firearms, also.

As illustrated therein, there is provided a forward fixed mounting block 23 having a lower surface 24 conforming with forward top surfaces of the receiver 22. A pair of ears 25 projecting above the upper surface thereof at transversely opposing positions provide thereon a V-block configuration adapted to receive the barrel 26 of the sight 21 laid longitudinally therebetween. Advantageously, the inner face portions 27 of said ears 25 slope convergingly downward and present line or point contacts at circumferentially separated locations on the sight barrel 26 thereby supported therebetween. Attachment of the block 23 may be had by providing mounting screws 28 which extend through vertical perforations in central portions of the block 23 to engage vertical threaded perforations in forward top portions of the receiver.

The rear windage and elevation adjustable mounting block assembly 29 includes a support member 31 having a side surface portion 32 adapted to conform with rear side surfaces of the receiver and attachable thereto by mounting screws 33 extended through horizontal perforations formed therein and engaging horizontal threaded perforations formed in underlying rear receiver portions, as illustrated in Figure 5 of the drawing. Such support member 31 is also provided with a vertically disposed outer side face portion 34 in which is formed a vertically disposed groove 35 having a rectangular cross section to support a member hereinafter described.

The vertically adjustable arm member 36, mentioned briefly above, may be formed with a horizontal arm portion 37 jointed to a vertical leg portion 38. Such leg portion 38 is adapted to slide in close fit relation within the groove 35, noted above, whereby the horizontal arm portion 37 projects over rear top portions of the receiver for purposes noted below. Locking means may be provided, as may best be seen by reference to Figure 8, to retain the leg portion 38 within the groove 35. A central vertical slot 39 is formed transversely in the leg 38 through which slot 39 is inserted a knurled head, locking screw 41 which engages a threaded perforation 42 formed centrally in the groove 35 bottom and whereby the head of said screw 41 bears forcibly through a washer plate 43 upon outer surfaces of the leg 38.

Means for micrometrically adjusting the vertical position of the arm member 36 may be provided as illustrated in Figure 7. As illustrated therein, a vertical perforation formed through the horizontal arm 37 somewhat inwardly of the juncture with the vertical leg portion 38 is adapted to receive the upper constricted end portion 44 of the vertical adjusting screw 45, whereby the shoulder portion 46, which separates portion 44 from the lower threaded portion 47 of said screw 45, is brought to bear on lower surface portions of the arm 37. Immediately below the said perforation in the arm 37, a threaded perforation 48 in the upper portion of the support member receives the lower threaded portion 47 of the screw 45. Rotation of the screw 45 by means of torque applied through an elevation adjusting knob 49 attached to the upper end thereof causes a vertical movement of the member 36, provided the locking screw 41 is previously loosened.

The micrometric click adjustment is obtainable by forming a series of radially oriented depressions 51 in the lower planar face of the knob 49 which is in contact with upper surfaces of arm 37. A detent ball 52 is then positioned in a vertical well 53 formed in the top surface of the arm 37 and brought to bear on the lower face of the knob 49 by a compression spring 54 situated in the lowest portion of the well. To complete the micrometric click elevation adjustment the lower skirt portion of the knob 49 may optionally be provided with suitable calibration marks.

In order to accommodate a movable carriage mounting block 55, designed to support rear portions of the sight barrel 26, the horizontal arm portion 37 of the vertically adjustable arm member 36 is provided, as illustrated in Figure 1, with downwardly converging inclined planar sides 56. The lower surface portions of the carriage block 55 is then provided with a central transverse slot 57 having inwardly diverging sides 58. Such slot 57 should receive the horizontal arm in close fit sliding relation to provide accurate alignment of the carriage block 55.

In order that the carriage block 55 may receive and properly position rear portion of the sight barrel 26, upper surfaces thereof are provided with a projecting pair of ears 59 at transversely opposing locations forming a general V-block configuration.

Advantageously, inner face portions 61 of the ears 59 are made to slope convergingly downward and present line or point contacts at circumferentially separated locations on said sight barrel 26, whereby more accurate positioning of the sight barrel is achieved.

Micrometric transverse click adjustment means for the carriage block 55 may be provided as illustrated in Figures 6 and 7 of the drawing. Such means include a transverse slot 62 formed centrally in the horizontal arm 37 of the vertically adjustable arm member 36 to accommodate a downwardly depending portion 63 of the carriage block 55 which portion 63 includes a transverse threaded perforation 64. The free end wall 65 of the arm 37 is perforated to receive the outer constricted end of a transverse adjustment screw 67, threaded portions of which engage perforation 64 of the carriage block portion 63. Accordingly, the shoulder portion 68 situated between the threaded and constricted portions of the screw 67, bears on inner terminal wall surface portions of the slot 62. With this arrangement, rotation of the screw 67 by means of a windage adjustment knob 69 attached to the projecting constricted end thereof causes a corresponding transverse movement of the carriage block 55 and resultant windage adjustment of said telescopic sight 21.

The micrometric click adjustment, for the carriage block 55, as shown in Figure 6, is obtained by forming a series of radially disposed depressions in the inward face portion 72 of the knob 69. Such depressions are engaged by a detent ball 73 disposed within a well 74 formed in the exterior free end surface of the arm 37 and urged outwardly by a compression spring 75 located in the bottom of said well.

In order to securely position the telescopic sight 21 on said fixed and adjustable blocks there is provided a sight engaging and positioning assembly 76 as shown in Figures 1, 2 and 4.

Such assembly 76 includes a split ring portion 77 having a considerably thickened peripheral section 78 and adapted to encircle the barrel portion 26 of the telescopic sight 21. Positive clamping of the split ring 77 to the barrel 26 is accomplished by providing a longitudinal gap 79 in thickened section 78 which gap 79 is constrictable by a clamping screw 81 bridging said gap and engaging adjacent ring portions.

The split ring portion 77 supports a rod member 82 projecting longitudinally forward from the forward edge surface 83 of the thickened ring section 78 and a retractable rod member 84 projecting longitudinally rearward from the rear edge surface of said section 78 which provide a downward positioning tension as noted hereinafter.

More particularly, as may be seen in Figure 1, the forward rod 82 includes a cylindrical section 86 seated in and projecting forwardly from a widened portion of a longitudinal bore 87 formed through the thickened ring section 78. Thenceforth such rod 82 continues as a horizontal flat spring portion 88 to a raised stop 89 and terminates in a projecting beveled tongue 91 which slips in resilient contact beneath a lip 92 projecting rearwardly from fixed mounting block 23.

As shown in Figure 4, the rear end of rod 82 is hollowed to receive the forward end of the retractable rod 84 extending therein through the rear constricted portion of the bore 87. When so positioned the said forward end of the rod 84 bears on a compression spring 93, disposed within the hollowed portion of rod 82, whereby longitudinal pressure on said rod 84 causes retraction thereof. A pin 94 projecting from a forward side surface thereof and traveling within a longitudinal slot 95 of appropriate length formed in rear wall portions of the rod 82, retains the retractable rod therein and limits longitudinal motion, thereby preventing accidental release of the retractable rod 84 upon recoil. Rearwardly projecting portions of the retractable rod 84 terminate in a beveled end 96 which is adapted to slip beneath an undercut beveled forward lip portion 97 of the carriage mounting block 55.

With the arrangement described in the foregoing, the telescopic sight 21 and attached positioning assembly 76 is easily attached to the remainder of the mount by forcing the beveled end 96 of the retractable rod 84 against the carriage mounting block in the position described above and compressing the spring 93. Now the torque end of the forward rod may be slipped beneath the rear lip 92 of the fixed mounting block 23. Upon release of the spring pressure, the retractable rod 84 and spring 93 drives the torque end of the forward rod forward beneath the said lip until the stop 89 engages rear edge portions of said lip. Due to the resilient action of the flat spring portion of said forward rod when in seated position and the downward wedging action of the beveled retractable rod end urged into seating relationship by spring 93, very effective seating of the sight barrel 26 is obtained in the aforesaid V-block configurations of the mounting blocks. Moreover, such seating is exactly reproducible each time that the sight is removed and remounted.

Ordinarily, the compression spring 93 which operates the retractable rod 82 must be of powerful design to withstand recoil loads. However, the spring may be made less powerful, thereby decidedly facilitating mounting and dismounting of the sight provided the novel lock arrangement, as shown in Figure 3, is employed. Such lock arrangement includes a lock pin 98 of generally rectangular cross section retained in a slot 99 formed transversely in the rear edge surface 85 of thickened split-ring section 78 whereby an end thereof may retractably engage a longitudinal slot 101 formed in retractable rod 84. The other end 102 of said pin 98 projects outwardly whereby such pin may be manually retracted to disengage the retractable rod 84 when the sight is to be mounted or dismounted. When the sight is properly mounted, such pin 98, in the depressed position, is positioned closely adjacent to the rear end of said slot 101 but not abutting. Accordingly, the sight may not be removed when such pin is in the depressed position but recoil is absorbed by the slight amount of slack allowed, and furthermore, the tension on the forward rod affected by the flat spring 88 thereof will resiliently maintain such rod in proper seated relation.

Appropriately, a plate 103 attached as by a screw to the rear edge surface 85 of the thickened split-ring section 78 and extending over said slot 99 serves to retain the lock pin therein. Also a stop portion 104 of the pin which abuts on an edge of plate 103 when the pin is retracted serves to limit the retractable excursion thereof. A detent arrangement including a ball 105 disposed in a well 106 located in the bottom of said slot 99 and urged against said pin 98 by a compression spring in the lower portion of said well is provided whereby when said pin is either retracted or depressed, the ball 105 partially enters depressions 107 or 108, respectively. Thereby said pin is positively retained in either the retracted or depressed position.

In order to convert the rear carriage mounting block 55 into a standard rear sight when the telescopic sight is removed, the arrangement illustrated in Figure 5 may be employed. As shown therein a V-notched plate 109 is attached as by screws 111 to portions of the block 55, thereby providing a windage and elevation adjustable open sight. Other sight types may also be attached in a similar manner. For example, such plate might be provided with a threaded perforation adapted to receive a peep sight insert.

What is claimed is:

1. A telescopic gunsight and mounting means therefor comprising a fixed forward block portion, means for attaching said block portion to a gun, a rear assembly, means for attaching said assembly to said gun, retractable rod means having a forward end portion and a rearward end adapted for detachably engaging said block and rear assembly respectively, a first spring means and a second spring means, said first spring means including a compression spring normally urging said rearward end rearwardly and into engagement with said rear assembly, and said second spring means including flat spring means for applying tension to said forward end portion of said rod means and permitting limited movement of said latter portion in a direction away from the longitudinal axis of said rod means.

2. A telescopic gunsight and mounting means therefor comprising a fixed forward block portion, means for attaching said block portion to a gun, a rear assembly, means for attaching said assembly to said gun, retractable rod means having a forward end portion and a rearward end adapted for detachably engaging said block and assembly, and locking means for said rod, means for locking said gunsight but permitting recoil absorption when said gunsight is in locked position on said gun on said block and assembly, said locking means including a locking lug and an axial slot on said rod with said lug being selectively movable into and out of said slot whereby on entry of the lug in the slot, movement of said rod is restricted to an amount equal to the spacing between an end of said slot and said lug.

3. A telescopic gunsight and mounting means therefor comprising a fixed forward block portion, means for attaching said block portion to a gun, a rear assembly, means for attaching said assembly to said gun, retractable rod means having a forward end portion and a rearward end adapted for detachably engaging said block and rear assembly respectively, a first spring means and a second spring means, said first spring means including a compression spring for urging said rearward end into engagement with said rear assembly, and said second spring means including a resilient flattened portion for applying tension to said forward end portion of said rod means when said forward end portion is engaged with said block, said block having a recessed portion for engagement by said forward end portion of said rod means, one of said two named portions being inclined whereby to cause a wedging action of said forward end portion of said rod means within said block recessed portion assisted by the tension of said second spring means.

4. A telescopic gunsight and mounting means therefor comprising a fixed forward block portion, means for attaching said block portion to a gun, a rear assembly, means for attaching said assembly to said gun, retractable rod means having a forward end portion and a rearward end adapted for detachably engaging said block and rear assembly respectively, a first spring means and a second spring means, said first spring means including a compression spring for urging said rearward end rearwardly, and said second spring means including a flat leaf-like spring for applying tension to said forward end portion of said rod means.

5. A telescopic gunsight and mounting means therefor comprising a fixed forward block portion, means for attaching said block portion to a gun, a rear assembly, means for attaching said assembly to said gun, said assembly having means for adjusting said gunsight for windage and elevation, retractable rod means having a forward end portion and a rearward end adapted for detachably slidably engaging said block and rear assembly respectively including a first spring means and a second spring means, said first spring means including a compression spring for urging said rearward end rearwardly into engagement with said rear assembly, and said second spring means including a flat spring for applying tension and resilient upward force to the forward end portion of said rod means so as to urge said forward end portion into firm engagement with said block.

6. A telescopic gunsight and mounting means therefor comprising a fixed forward block portion, means for attaching said block portion to a gun, a rear assembly, means for attaching said assembly to said gun, retractable rod means having a forward end portion and a rearward end adapted for detachably engaging said block and assembly, and locking means for said rod, means for locking said gunsight but permitting recoil absorption when said gunsight is in locked position on said gun on said block and assembly, said last-named means including a slot having ends on said retractable rod means and a pin normally located intermediate the ends of said slot.

7. A telescopic sight mount comprising a fixed forward block portion, a rear assembly, means for attaching said block portion and said assembly to a gun, sight positioning means including a portion adapted to firmly engage portions of said sight and retractable rod means having a forward end portion and a rearward end adapted for detachably engaging said forward block and said rear assembly, respectively, first spring means normally urging said forward and rearward ends axially apart, and second resilient means permitting limited movement of said forward end portion only in a direction away from the longitudinal axis of said rod means.

8. A telescopic sight mount comprising a forward mounting block portion adapted for attachment to a firearm, a rear mounting block portion adapted for attachment to a firearm at a location longitudinally spaced from said forward block, a sight positioning assembly having a portion thereof adapted for secure engagement with a barrel portion of a sight, said assembly being further provided with a forwardly directed element to engage said forward mounting block and a retractable element extending rearwardly to engage said rear mounting block, spring means normally urging said retractable member rearwardly to its most extended position, and manually operated lock means operable for limiting the amount of retraction of said retractable member so as to limit the forward movement of said retractable member to less than that permitted when said lock means are inoperative.

9. Apparatus as set forth in claim 8 in which said lock means includes a slotted portion on said retractable element and a member selectively movable into and out of said portion intermediate the ends thereof, said member when in said portion limiting forward movement of said retractable element so as to prevent the combined longitudinal length of said forwardly directed element and said retractable element from being less than the longitudinal spacing between the engaged portions of the respective mounting blocks.

References Cited in the file of this patent
UNITED STATES PATENTS

| | | |
|---|---|---|
| 1,970,623 | Redfield | Aug. 21, 1934 |
| 2,125,828 | Turner | Aug. 2, 1938 |
| 2,401,825 | Gruver | June 11, 1946 |
| 2,452,145 | Pike | Oct. 26, 1948 |
| 2,542,513 | Hackett | Feb. 20, 1951 |
| 2,600,985 | Fluty | June 17, 1952 |
| 2,621,410 | Street | Dec. 16, 1952 |
| 2,622,329 | Demick | Dec. 23, 1952 |
| 2,653,386 | Winton | Sept. 29, 1953 |